United States Patent
Borrell Carbonell et al.

(10) Patent No.: US 11,230,055 B2
(45) Date of Patent: Jan. 25, 2022

(54) ADDITIVE MANUFACTURING SYSTEM FLUID EJECTOR

(71) Applicant: HEWLETT-PACKARD DEVELOPMENT COMPANY, L.P., Houston, TX (US)

(72) Inventors: Oriol Borrell Carbonell, Barcelona (ES); Melinda M Valencia, San Diego, CA (US); Andre Garcia, San Diego, CA (US); Thomas M Sabo, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 325 days.

(21) Appl. No.: 16/307,081

(22) PCT Filed: Oct. 7, 2016

(86) PCT No.: PCT/US2016/056089
§ 371 (c)(1),
(2) Date: Dec. 4, 2018

(87) PCT Pub. No.: WO2018/067178
PCT Pub. Date: Apr. 12, 2018

(65) Prior Publication Data
US 2020/0307080 A1 Oct. 1, 2020

(51) Int. Cl.
| B41J 2/01 | (2006.01) |
| B29C 64/209 | (2017.01) |
| B41J 2/14 | (2006.01) |
| B33Y 10/00 | (2015.01) |
| B33Y 30/00 | (2015.01) |

(52) U.S. Cl.
CPC ........... *B29C 64/209* (2017.08); *B41J 2/1404* (2013.01); *B33Y 10/00* (2014.12); *B33Y 30/00* (2014.12); *B41J 2002/14403* (2013.01); *B41J 2002/14475* (2013.01)

(58) Field of Classification Search
CPC ............. B33Y 30/00; B41J 2002/14475; B41J 2202/11; B29C 64/209; B29C 64/20
See application file for complete search history.

(56) References Cited

U.S. PATENT DOCUMENTS

| 6,076,723 | A | 6/2000 | I-Tsung Pan |
| 6,557,974 | B1 | 5/2003 | Weber |
| 7,014,297 | B2 | 3/2006 | Miki et al. |
| 7,790,074 | B2 * | 9/2010 | Pan ........................ B33Y 40/00 264/40.1 |
| 8,708,462 | B2 | 4/2014 | Silverbrook |
| 9,289,986 | B2 | 3/2016 | Mallinson et al. |
| 10,183,496 | B2 * | 1/2019 | White .................... B41J 2/2121 |

(Continued)

FOREIGN PATENT DOCUMENTS

| CN | 1092482 | 9/1994 |
| CN | 102363350 | 2/2012 |

(Continued)

*Primary Examiner* — Huan H Tran
(74) *Attorney, Agent, or Firm* — Fabian VanCott

(57) ABSTRACT

An additive manufacturing system may include a fluid ejector. The fluid ejector may be movable across a build material distributor at a maximum speed of less than or equal to 40 inches per second. The fluid ejector may include a nozzle having a non-circular bore.

20 Claims, 8 Drawing Sheets

(56) References Cited

U.S. PATENT DOCUMENTS

| | | |
|---|---|---|
| 2005/0025905 A1 | 2/2005 | Pan et al. |
| 2009/0250162 A1* | 10/2009 | Rivas ................... B41J 2/1634 |
| | | 156/272.2 |
| 2012/0004370 A1 | 1/2012 | Scott |
| 2014/0315710 A1* | 10/2014 | Lauritzen ............... B01J 29/068 |
| | | 502/74 |
| 2014/0375710 A1 | 12/2014 | Blair et al. |
| 2017/0305152 A1* | 10/2017 | White ................... B41J 2/1433 |
| 2017/0313066 A1* | 11/2017 | White ................... B41J 2/1404 |
| 2017/0368838 A1* | 12/2017 | Ross ................... B41J 2/04551 |

FOREIGN PATENT DOCUMENTS

| | | | | |
|---|---|---|---|---|
| CN | 203665960 | | 6/2014 | |
| CN | 203665960 U | | 6/2014 | |
| CN | 104742366 | | 7/2015 | |
| CN | 105247199 | | 1/2016 | |
| CN | 105313271 | | 2/2016 | |
| CN | 105643927 A | | 6/2016 | |
| CN | 205467375 U | | 8/2016 | |
| EP | 3000602 A1 | | 3/2016 | |
| WO | WO-2009138431 | | 11/2009 | |
| WO | WO-2015100085 | | 7/2015 | |
| WO | WO 2016/068949 | * | 5/2016 | .............. B41J 2/175 |
| WO | WO-2016090286 A1 | | 6/2016 | |
| WO | WO-2016137490 | | 9/2016 | |

\* cited by examiner

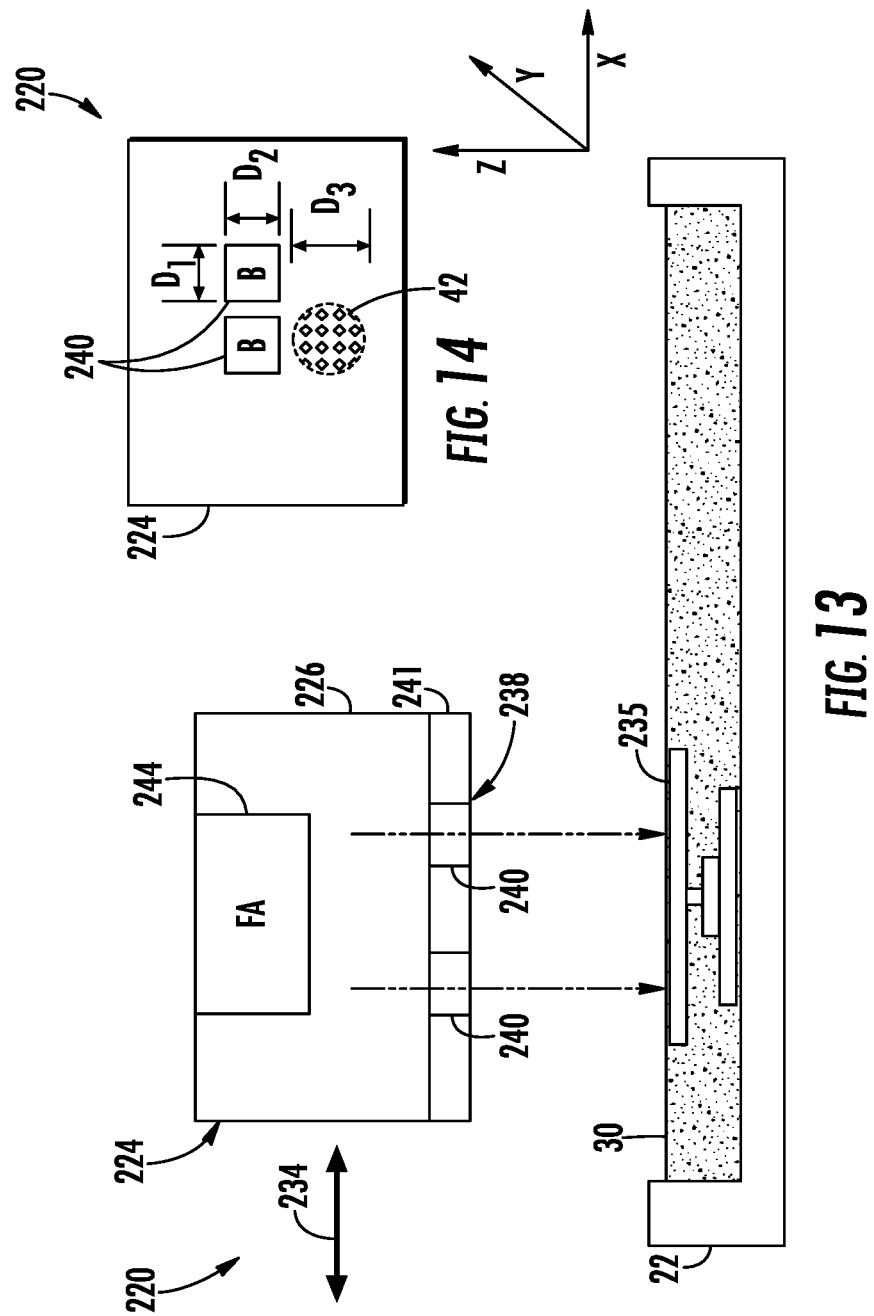

ADDITIVE MANUFACTURING SYSTEM FLUID EJECTOR

BACKGROUND

Additive manufacturing systems, such as three-dimensional (3-D) printers, employ an additive manufacturing process to create objects from plastic or other materials. Such additive manufacturing systems include a build bed or build volume in which one or more objects are generated during a build cycle. In some systems, an operator may load digital files containing digital representations of each of the objects to be generated during a build cycle. The digital representations of the objects contained in a digital file are digitally sliced into layers. During the build cycle, the additive manufacturing system forms such layers upon one another to generate the three-dimensional objects.

BRIEF DESCRIPTION OF THE DRAWINGS

FIG. 13 is a sectional view schematically illustrating an example additive manufacturing system.

FIG. 14 is a bottom plan view of a portion of an example fluid ejector of the example system of FIG. 13.

DETAILED DESCRIPTION OF EXAMPLES

Figure 1:
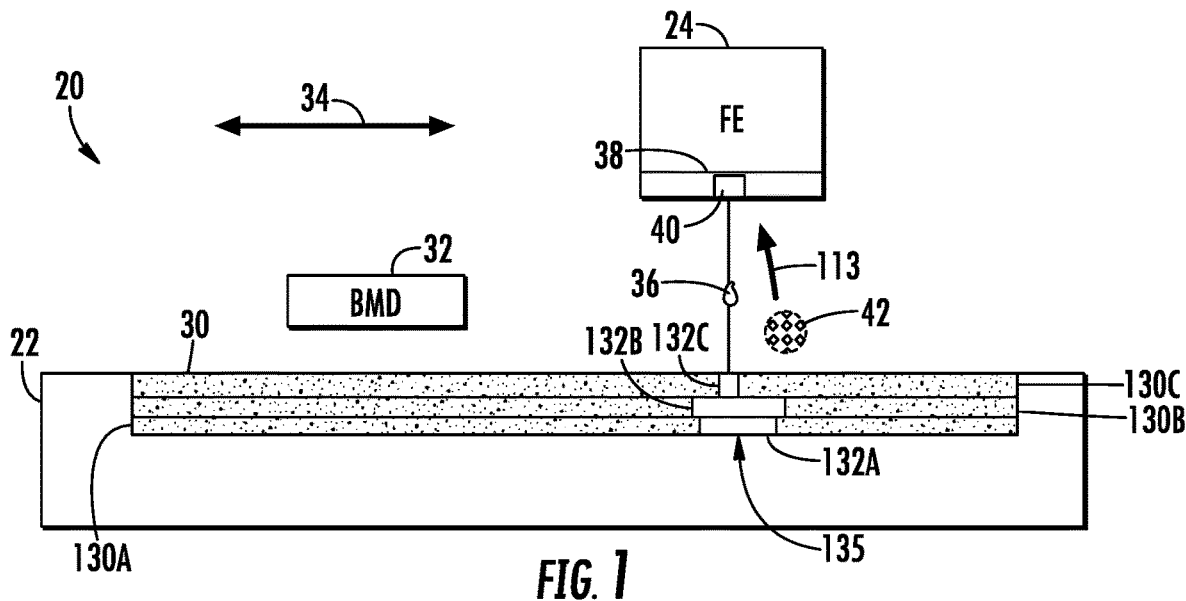
FIG. 1 is a sectional view schematically illustrating an example additive manufacturing system.

Examples provided herein include systems, methods and fluid ejectors for additive manufacturing. In the examples, fluid is selectively ejected or patterned onto a layer of particulate build material, wherein the fluid facilitates solidification of a portion of the layer and wherein the process repeated to form multiple stacked layers of solidified particulate build material that collectively form a three-dimensional article or product. In some implementations, the fluid selectively applied to the layer of particulate build material solidifies about the particulate build material. In other implementations, the fluid selectively applied to layer particulate build material chemically reacts with the particulate build material or serves as a catalyst for subsequent fusing, joining or other solidification of the particulate build material contacted by the fluid. In some examples, some fluid selectively applied to a build material layer may serve as an inhibitor for subsequent fusing. As will be appreciated, some example systems may selectively distribute a first fluid upon a build layer at first locations on the build layer to promote subsequent fusing of build material, and the example systems may selectively distribute a second fluid upon the build layer at second locations on the build layer to inhibit subsequent fusing of build material.

The fluid is selectively applied to the particulate build material through a nozzle opening or bore from a fluid ejector that is moved across the layer particulate build material. During such application of fluid, particles of the particulate build material become airborne. Intrusion of such airborne particles into the nozzle opening or bore may clog the nozzle bore, may clog supply of fluid to the nozzle or may otherwise detrimentally impact the performance of fluid ejector.

The example systems, methods and fluid ejectors may inhibit the ingress or intrusion of airborne particulate build material particles into the nozzle bore. In some implementations, the nozzle bore may have a non-circular shape. The non-circular shape facilitates the concurrent ejection of a sufficient quantity of fluid to facilitate solidification of the particulate build material forming the three-dimensional article while at the same time inhibiting the intrusion of individual airborne particulate build material particles through the nozzle bore. The non-circular shape is dimensioned such that the expected or anticipated size of the individual airborne particulate build material particles are too large in at least one dimension to pass through the non-circular shape of the nozzle bore.

In some implementations, the fluid ejector concurrently ejects a sufficient quantity of fluid through multiple nozzle bores, similar to a shower head, wherein each of the bores is sized or dimensioned less than the expected anticipated size of the individual airborne particulate build material particles, but wherein the number of nozzle bores through which fluid is concurrently ejected is large enough such that a sufficient quantity of fluid may be ejected at any one time to facilitate solidification of the particulate build material to form the three-dimensional article. In one implementation, the individual nozzle bores may be circular in shape. In another implementation, the individual nozzle bores may be non-circular in shape, further inhibiting the intrusion of individual airborne particulate build material particles.

The example systems, methods and fluid ejectors may further reduce clogging of supply passages leading to the fluid ejector. Fluid may be supplied to the fluid ejector through an inlet connected to a port leading to a firing or ejection chamber adjacent the nozzle bore or nozzle bores. To inhibit the ingress of particles through the inlet from a fluid supply and into the ejection chamber, a pillar may be provided within the inlet. In some implementations, the pillar is spaced from side to the inlet to allow any building material particles that have entered through the nozzle bore to pass by the pillar and into a fluid supply or fluid slot, rather than accumulating between the pillar and the port where such an accumulation might otherwise clog the supply of fluid to the ejection chamber of the fluid ejector.

Figure 2:
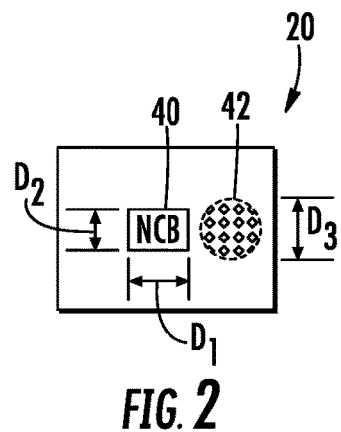
FIG. 2 is a bottom plan view of a portion of an example fluid ejector of the example system of FIG. 1.

FIGS. 1 and 2 schematically illustrate an example additive manufacturing system 20. System 20 comprises build bed 22 and fluid ejector 24. Build bed 22, sometimes also referred to as a build volume, a build material support, or a build tray, comprises a continuous uninterrupted volume containing particulate build material 30, such as a powder, portions of which are selectively solidified, layer by layer, to additively generate three dimensional parts or objects. In such examples, the build bed 22 corresponds to a build area, where the build area generally describes the area in which operations associated with an additive manufacturing process may be performed. In the example illustrated, build bed 22 is stationary in that build bed 22 does not move horizontally, in the x-y plane, as fluid is being ejected onto the particular build material 30. In some implementations, build bed 22 or portions of build bed 22 may move in a vertical direction, along the z axis, towards and away from fluid ejector 24 as portions of new layers of material 30 are being solidified and stacked upon one another through deposition of fluid from fluid ejector 24. For example, after a first layer of the part or object has been generated, the build bed may be lowered and a new layer of build material may be distributed in the build area by a build material distributor 32 above the uppermost first layer of the part or object, wherein portions of the new layer of build material are selectively solidified and may join with previously solidified portions of the part or object. A build material distributor 32, as described herein may comprise for example, a wiper blade, a roller, a spray mechanism, or other such components that may distribute a layer of build material.

Fluid ejector 24 comprises a device that selectively ejects fluid, such as droplets of fluid onto the particulate build material 30. As indicated by arrows 34, fluid ejector 24 is moved, driven or translated across build bed 22 so as to deposit fluid 36 at prescribed spaced locations across the layer of particulate build material supported by bed 22. Through such selective deposition, the two dimensional shape of each solidified layer of particulate build material may be controlled and varied such that the collection of differently shaped layers may form a three-dimensional article or product.

In one implementation, fluid ejector 24 is movable across the build area at a maximum speed of less than or equal to 40 in./s. At such a speed, any satellite droplets of fluid, smaller droplets of fluid separate from the main droplet being ejected, are less dispersed from the main droplet. As a result, the dispersion of such satellite droplets, the distance of such deposited satellite droplets from the deposited main droplet, may not impact additive manufacturing performance or quality of the final article. In some implementations, fluid ejector 24 is movable across the build area at a maximum speed greater than or equal to 40 in./s.

As further shown by FIGS. 1 and 2, fluid ejector 24 ejects fluid through a nozzle 38 having a non-circular bore 40. FIG. 2 is a bottom view of a portion of fluid ejector 24, schematically illustrating the non-circular opening or non-circular bore 40. It should be appreciated that non-circular bore 40, though schematically illustrated with a box or block, may have any non-circular shape in the example illustrated in FIG. 2. Non-circular bore 40 facilitates the concurrent ejection of a sufficient quantity of fluid to facilitate solidification of the particulate build material forming the three-dimensional article while at the same time inhibiting the intrusion of individual airborne particulate build material particles through the nozzle bore. The non-circular shape is dimensioned such that the expected or anticipated size of the individual airborne particulate build material particles are too large, in at least one dimension, to pass through the non-circular shape of the nozzle bore. For example, as schematically represented in FIG. 2, the non-circular bore 40 has at least one dimension D1 or D2 less than at least one dimension D3 of the expected or anticipated individual airborne particulate build material particle 42.

In one implementation, non-circular bore 40 is shaped and dimensioned so as to have a cross-sectional area of at least 100 um$^2$ to allow a sufficient quantity of fluid to be concurrently ejected (such as being ejected by an individual actuator firing) to facilitates solidification of a sufficient quantity of particulate build material for additive manufacturing. In one implementation, non-circular bore 40 is shaped and dimensioned so as to facilitate the ejection of a volume of at least 2 pL through non-circular bore 40 during a single actuation or firing of the fluid ejector 24. In one implementation, non-circular bore 40 has a smallest dimension less than or equal to 10 um. In one implementation, non-circular bore 40 has a smallest dimension less than or equal to 5 um. In one implementation, non-circular bore 40 has a smallest dimension less than or equal to 12 um with a total cross-sectional area (the two dimensional area of the opening through which fluid passes) of at least 180 um$^2$.

In one implementation, for a given particulate build material, non-circular bore 40 may be sized to block or impede the intrusion of at least 75% of any particles of the particulate build material that may become airborne. In other words, the size of the particulate build material particles that do become airborne may have spectrum or distribution of various sizes, wherein non-circular bore 40 is shaped and dimensioned so to block or impede the intrusion of airborne particles having sizes making up the top 75% of the range of sizes of particles that may become airborne. In yet another implementation, for a given particulate build material, non-circular bore 40 may be sized to block or impede the intrusion of individual particulate build material particles having sizes making up the top 90% of the range of sizes of particles that may become airborne. In some implementations, for a given particulate build material, non-circular bore 40 may be sized to block or impede the intrusion of individual particulate build material particles of all sizes that may become airborne.

Figure 3:
FIGS. 3-10 are diagrams illustrating example non-circular shapes for a non-circular bore of the example fluid ejector of FIG. 2.
Figure 4:
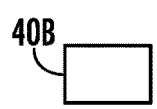
Figure 5:
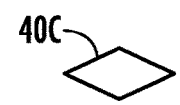
Figure 6:
Figure 7:
Figure 8:
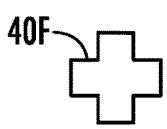
Figure 9:
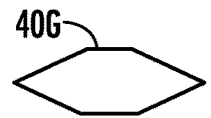

In one example implementation, the particulate build material comprises a particular build material selected from a group of build materials consisting of polyamides, ceramics, or metals. In such an example implementation, the fluid ejected by fluid ejector 24 comprises a fluid selected from a group of fluids including fusing agents, cooling agents, adhesives, catalysts or reactants. In such an example implementation, the non-circular bore 40 has a cross-sectional area of at least 100 um$^2$ and a minimum dimension less than or equal to 10 um. In one implementation, the particulate build material comprises a polyamide having individual particulates having a range of sizes between 1 um and 150 um, wherein the fluid utilized to solidify the particulate material comprises fusing agents and cooling agents, and wherein the non-circular bore has a cross-sectional area of at least 280 um$^2$ and a minimum dimension less than or equal to 10 um FIGS. 3-10 illustrate various example non-circular shapes for non-circular bore 40. FIG. 3 illustrates an example non-circular bore 40A having an ellipse or oval shape. FIG. 4 illustrates an example non-circular bore 40B having a polygonal shape, shown as a rectangle such as the rectangle having unequal sides as shown or a rectangle having equal sides (a square) in other implementations. FIG. 5 illustrates an example non-circular bore 40C having a polygonal shape, shown as a diamond. FIG. 6 illustrates an example non-circular bore 40D of a polygonal shape shown as a triangle. FIG. 7 illustrates an example non-circular bore 40E have a polygonal shape shown as a star. Although the star is illustrated as having seven points, the star may have a fewer or greater number of such points. FIG. 8 illustrates an example non-circular bore 40F having a polygonal shape shown as a cross. FIG. 9 illustrates an example non-circular bore 40G having a polygonal shape shown as a diamond with flat sides.

Figure 10:
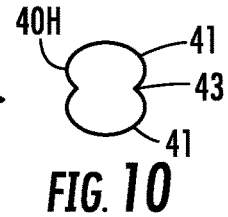

FIG. 10 illustrates an example non-circular bore 40H having an hourglass shape. For example, in one implementation, non-circular bore 40H may have an hourglass shape with two openings 41, each of which having at least one dimension less than the expected or anticipated dimension or size of airborne particles that may result from particulate build material 30, wherein the two openings 41 are interconnected by a narrower throat region 43. In the example illustrated, opening 41 are oval in shape. In other implementations, opening 41 may be circular or may have other shapes.

Figure 11:
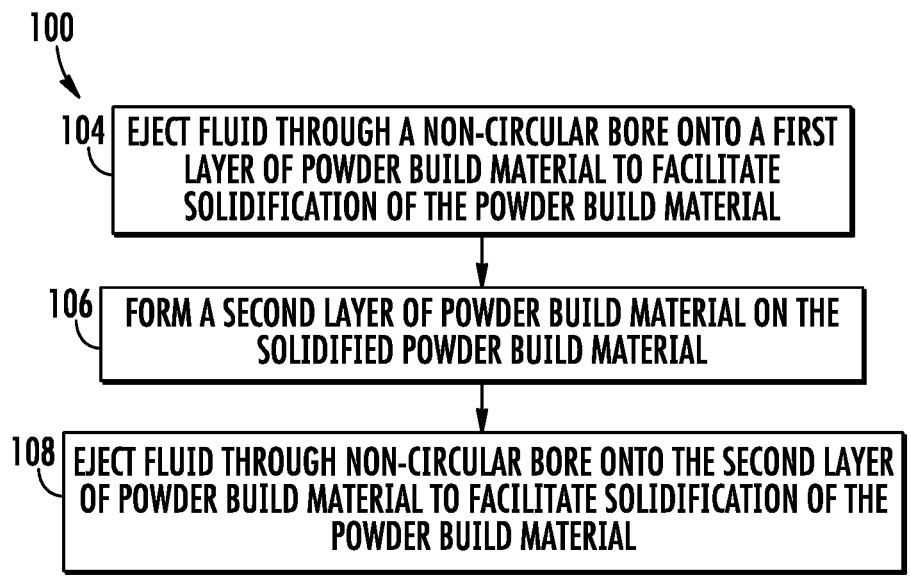
FIG. 11 is a flow diagram of an example method for additive manufacturing.

FIG. 11 is a flow diagram of an example method 100 for carrying out additive manufacturing, such as 3-D printing. For ease of discussion, method 100 is described as being carried out by additive manufacturing system 20. It should be appreciated that method 100 may likewise be carried out by any of the additive manufacturing systems or fluid ejectors described hereafter or by any other additive manufacturing systems or fluid ejectors having a non-circular bore.

As indicated by block 104, fluid ejector 24 ejects fluid through a non-circular bore 40 onto a first layer 130A of particulate build material 30 (shown in FIG. 1) to facilitate solidification of the particulate build material to form a solidified region 132A of the layer 130A. As indicated by block 106, a second layer 130B (shown in FIG. 1) of particulate build material is formed over or on top of the solidified particulate build material, region 132A. As indicated by block 108, fluid ejector 24 ejects fluid through non-circular bore 40 onto the second layer 130B of the particulate build material to facilitate solidification of the particulate build material of layer 130B, forming solidified region 132B, wherein region 132B is joined or fused to the underlying solidified region 132A. The fluid is ejected or deposited on layer 130B in block 106 may be ejected through the same non-circular bore 40 through which fluid was ejected to form solidified region 132A or may be ejected through the different non-circular bore 40 of fluid ejector 24 in implementations where fluid ejector 24 may comprise a multitude of non-circular bores 40, each of the non-circular bores 40 having a distinct associated fluid actuator.

As further shown by FIG. 1, blocks 106 and 108 may be repeated any number of times as desired to form additional layers of solidified regions to complete the final three-dimensional article or product composed of the multiple interconnected or fused solidified regions. In the example illustrated in FIG. 1, a third layer 130C of particulate build material is formed over or on top of the solidified particulate build material, region 132B. Fluid ejector 24 ejects fluid through non-circular bore 40 onto the third layer 130C of the particulate build material to facilitate solidification of the particulate build material of layer 130C, forming solidified region 132C, wherein region 132C is joined or fused to the underlying solidified region 1326 to form the three-dimensional article 135 which may be subsequently removed from the volume of an solidified particulate build material 30.

As indicated above and illustrated in FIG. 1, during the ejection of the fluid onto the different layers 130A, 130B, 130C of particulate build material, particles 42 may become airborne and may migrate, as indicated by arrow 113 in FIG. 1 towards non-circular bore 40 of fluid ejector 24. The non-circular shape of bore 40 inhibits the intrusion of such airborne particles 42 through bore 40. As a result, the non-circular shape of bore 40 inhibits or reduces the likelihood of bore 40 becoming clogged or occluded with particles of particulate build material 30.

In one implementation, for the given particulate build material 30 being utilized in method 100, non-circular bore 40 may be sized to block or impede the intrusion of at least 75% of any particles of the particulate build material that may become airborne. In other words, the size of the particulate build material particles that do become airborne may have spectrum or distribution of various sizes, wherein non-circular bore 40 is shaped and dimensioned so to block or impede the intrusion of airborne particles having sizes making up the top 75% of the range of sizes of particles that may become airborne. In yet another implementation, for a given particulate build material 30 being utilized in method 100, non-circular bore 40 may be sized to block or impede the intrusion of individual particulate build material particles having sizes making up the top 90% of the range of sizes of particles that may become airborne. In some implementations, for a given particulate build material 30 being utilized in method 100, non-circular bore 40 may be sized to block or impede the intrusion of individual particulate build material particles of all sizes that may become airborne.

Figure 12:
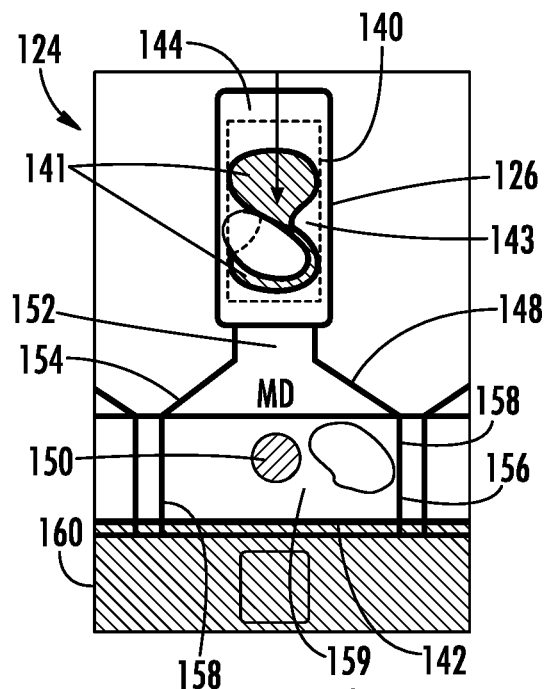
FIG. 12 is a sectional view of an example fluid ejector for the additive manufacturing system of FIG. 1.

As indicated above, in some implementations, to provide sufficient volume for a droplet or droplets of the fluid being concurrently ejected during a single firing or fluid actuation, the dimensioning of non-circular bore 40 may be large enough so as to not impede the intrusion of 100% of all airborne particulate build material particles, so as to not impede the intrusion of the entire range of sizes of particulate build material particles. Those particulate build material particles that do enter fluid ejector 24 through bore 40 may occlude the supply of fluid to a fluid ejector 24. FIG. 12 is a sectional view of an example fluid ejector 124 that reduces the likelihood of the supply of fluid being occluded by such intruding particulate build material particles. Fluid ejector 124 may be utilized in place of fluid ejector 24 described above.

As shown by FIG. 12, fluid ejector 124 comprises ejection chamber 126, non-circular bore 140, fluid actuator 144 (shown in broken lines), inlet 148 and pillar 150. Ejection chamber 126 comprises an internal volume extending adjacent to non-circular bore 40. Ejection chamber 126 fills or receives fluid to be ejected through non-circular bore 40. Ejection chamber 126 receives fluid from inlet 148 through port 152. Port 152 is shaped and sized to facilitate the passing of individual particulate build material particles that may have entered ejection chamber 126 through non-circular bore 140 into inlet 148.

In the example illustrated, port 152 has a minor dimension MD (the smallest dimension) that is still larger than an expected or anticipated maximum dimension of particulate build material particles that may have entered ejection chamber 126. In one implementation, the minor dimension MD facilitate passing of at least the top 75% of the range of sizes of the individual particulate build material particles that may have entered ejection chamber 126. In one implementation, the minor dimension MD facilitate passing of at least the top 90% of the range of sizes of the individual particulate build material particles that may have entered ejection chamber 126. In one implementation, In one implementation, the minor dimension MD facilitate passing of the entire range of sizes of the individual particulate build material particles that may have entered ejection chamber 126.

Non-circular bore 140 is similar to non-circular bore 40 described above. Non-circular bore 140 is illustrated as having an example hourglass shape, similar to the example hourglass shape shown in FIG. 10. Non-circular bore 140 has two openings 141, each of which having at least one dimension less than the expected or anticipated dimension or size of airborne particles that may result from particulate build material 30, wherein the two openings 141 are interconnected by a narrower throat region 143. The narrower throat region 143 has a dimension less than the expected or anticipated dimension of an individual airborne particulate build material particle being used in the additive manufacturing process carried out by the additive manufacturing system in which fluid ejector 124 is utilized.

In one implementation, non-circular bore 140 is shaped and dimensioned so as to have a cross-sectional area of at least 100 um² to allow a sufficient quantity of fluid to be concurrently ejected (such as being ejected by an individual actuator firing) to facilitates solidification of a sufficient quantity of particulate build material for additive manufacturing. In one implementation, non-circular bore 40 is shaped and dimensioned so as to facilitate the ejection of a volume of at least 2 pL through non-circular bore 410 during a single actuation or firing of the fluid ejector 124. In one implementation, non-circular bore 140 has a smallest dimension less than or equal to 10 um. In one implementation, non-circular bore 140 has a smallest dimension less than or equal to 5 um. In one implementation, non-circular bore 140 has a smallest dimension less than or equal to 12 um with a total cross-sectional area (the two dimensional area of the opening through which fluid passes) of at least 180 um².

In one implementation, for a given particulate build material, non-circular bore 140 may be sized to block or impede the intrusion of at least 75% of any particles of the particulate build material that may become airborne. In other words, the size of the particulate build material particles that do become airborne may have spectrum or distribution of various sizes, wherein non-circular bore 40 is shaped and dimensioned so to block or impede the intrusion of airborne particles having sizes making up the top 75% of the range of sizes of particles that may become airborne. In yet another implementation, for a given particulate build material, non-circular bore 140 may be sized to block or impede the intrusion of individual particulate build material particles having sizes making up the top 90% of the range of sizes of particles that may become airborne. In some implementations, for a given particulate build material, non-circular bore 140 may be sized to block or impede the intrusion of individual particulate build material particles of all sizes that may become airborne.

Fluid actuator 144 comprises a device to forcefully eject droplets of fluid through non-circular bore 140. In one implementation, fluid actuator 144 comprises a bubble jet resistor which generates heat to vaporize the adjacent fluid and form a bubble that forcefully expels surrounding fluid within chamber 126 through non-circular bore 140 during a firing or actuation. In another implementation, fluid actuator 44 may comprise a membrane which is driven to forcefully expel fluid within chamber 126 through non-circular bore 40 during a firing or actuation. For example, in one implementation, the membrane may be part of a piezo-resistive fluid actuator. In yet other implementations, other forms of fluid actuators 44 may be utilized to selectively expel drops of fluid through non-circular bore 144.

Inlet 148 feeds or supplies fluid from a fluid supply 160, shown as a fluid supply slot extends along multiple consecutive fluid ejectors 124. In the example illustrated, inlet 148 comprise a funnel or tapering region 154 that tapers from the larger or wider portion 156 of inlet 148 to the smaller sized port 152. In other implementations, inlet 148 may omit tapering region 154.

Pillar 150 comprises a column located within inlet 148. Pillar 150 is spaced from internal sides 158 of inlet 148 so as to form at least one passage 159 between one of sides 158 and pillar 150. Passage 159 has a minor dimension greater than the minor dimension of port 152 facilitating the passage of particulate build material particles into fluid supply 160. As a result, particulate build material particles that may have entered through bore 140 and passed through port 152 into inlet 148 do not become trapped within inlet 148 by pillar 150, reducing the likelihood of such particles potentially occluding or impeding the supply of fluid to ejection chamber 126 of fluid ejector 124. FIG. 12 illustrates an example particulate build material particle 142 that has entered chamber 126, wherein the particulate build material particle 142 is allowed to pass through passage 159, between pillar 150 and side 158 of inlet 148 into fluid supply 160. The particulate build material particle 142 does not become entrapped and is less likely to impede the supply of fluid through inlet 148 to ejection chamber 126.

FIGS. 13 and 14 illustrate an example additive manufacturing system 220. FIG. 13 is a diagram providing a sectional view that schematically illustrates system 220. FIG. 14 is a bottom plan view of an example fluid ejector 224 of system 220. System 220 is similar to system 20 described above except that system 220 comprises fluid ejector 224 in place of fluid ejector 24. Those remaining components of system 220 which correspond to components of system 20 are numbered similarly.

As with fluid ejector 24, fluid ejector 224 comprises a device that selectively ejects fluid, such as droplets of fluid onto the particulate build material 30. As indicated by arrows 234, fluid ejector 24 is moved, driven or translated across build bed 22 so as to deposit fluid 36 at prescribed spaced locations across the layer of particulate build material supported by bed 22. Through such selective deposition, the two dimensional shape of each solidified layer of particulate build material may be controlled and varied such that the collection of differently shaped layers may form a three-dimensional article or product.

In one implementation, fluid ejector 124 is movable across the build bed at a maximum speed of less than or equal to 40 in./s. At such a speed, any satellite droplets of fluid, smaller droplets of fluid separate from the main droplet being ejected, are less dispersed from the main droplet. As a result, the dispersion of such satellite droplets, the distance of such deposited satellite droplets from the deposited main droplet, may not impact additive manufacturing performance or quality of the final article.

As schematically shown by FIG. 13, fluid ejector 124 comprises an ejection chamber 226, a nozzle 238 having a plurality of bores 240 and a fluid actuator 244. Ejection chamber 226 comprises an internal volume extending adjacent to non-circular bores 240. Ejection chamber 226 fills or receives fluid to be ejected through each of bores 240 during a single actuation or firing of fluid actuator 244.

Nozzle 238 comprises a set of openings or bores 240 through which fluid is ejected by fluid actuator 244 during a single actuation of fluid actuator 244. Bores 240 may be formed an orifice plate 241, wherein bores 240 extend adjacent to and eject fluid from a single ejection chamber 226. As further shown by FIG. 13, the fluid ejected by bores 240 facilitates solidification of different regions of particulate build material 30 to form a three-dimensional article 235.

FIG. 14 is a bottom view of a portion of fluid ejector 224, schematically illustrating the bores 240. It should be appreciated that although each of bores 240 is schematically illustrated with a box or block, each of bores 240 may have any circular or non-circular shape in the example illustrated in FIG. 14. The set are collection of bores 240 facilitate the concurrent ejection of a sufficient quantity of fluid to facilitate solidification of the particulate build material forming the three-dimensional article while at the same time inhibiting the intrusion of individual airborne particulate build material particles through the nozzle bore. Each individual bore 240 is dimensioned such that the expected or anticipated size of the individual airborne particulate build material particles are too large, in at least one dimension, to pass through the individual nozzle bore. For example, as schematically represented in FIG. 14, each individual bore 240 has at least one dimension D1 or D2 less than at least one dimension D3 of the expected or anticipated individual airborne particulate build material particle 42.

In one implementation, the individual bores 240 are shaped and dimensioned such that the entire set of bores 240 have a collective cross-sectional area of at least 100 um² to allow a sufficient quantity of fluid to be concurrently ejected (such as being ejected by an individual actuator firing) to facilitates solidification of a sufficient quantity of particulate build material for additive manufacturing. In one implementation, set of bores 240 have individual bores shaped and dimensioned so as to facilitate the ejection of a volume of at least 2 pL through the set of bores 240 during a single actuation or firing of the fluid ejector 224. In one implementation, each individual bore 240 has a smallest dimension less than or equal to 10 um. In one implementation, each individual bore 240 has a smallest dimension less than or equal to 5 um. In one implementation, each individual bore 240 has a smallest dimension less than or equal to 10 um with a total cross-sectional area (the two dimensional area of the opening through which fluid passes) of at least 180 um.

In one implementation, for a given particulate build material, each individual bore 240 may be sized to block or impede the intrusion of at least 75% of any particles of the particulate build material that may become airborne. In other words, the size of the particulate build material particles that do become airborne may have spectrum or distribution of various sizes, wherein each individual bore 240 is shaped and dimensioned so to block or impede the intrusion of airborne particles having sizes making up the top 75% of the range of sizes of particles that may become airborne. In yet another implementation, for a given particulate build material, each individual bore 240 may be sized to block or impede the intrusion of individual particulate build material particles having sizes making up the top 90% of the range of sizes of particles that may become airborne. In some implementations, for a given particulate build material, each individual bore 240 may be sized to block or impede the intrusion of individual particulate build material particles of all sizes that may become airborne.

In one implementation, the individual bores 240 of the set of bores forming nozzle 238 are sufficiently dense and closely spaced such that individual fluid droplets being ejected during a single actuation merge after ejection or upon material 30. In one implementation, the individual bores 240 of the set of bores forming nozzle 238 are spaced from one another by a spacing of less than or equal to 10 um. In one implementation, the individual bores 240 are clustered in a two dimensional array. In one implementation, the individual bores 240 are positioned about a center point.

Figure 15:
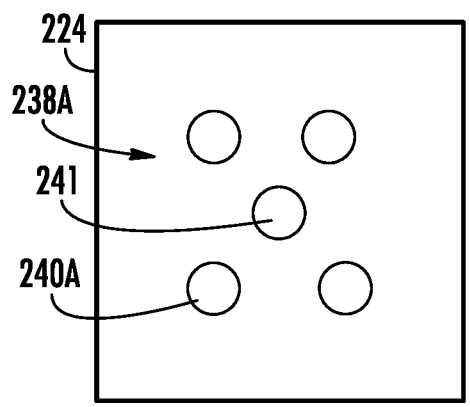
FIGS. 15-17 are diagrams illustrating example nozzles for the example fluid ejector of FIG. 14.
Figure 16:
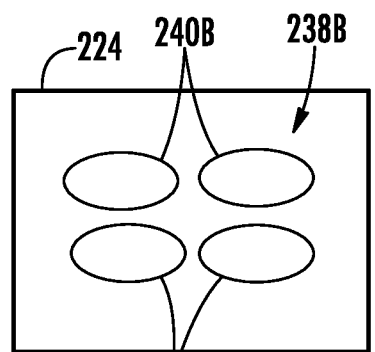
Figure 17:
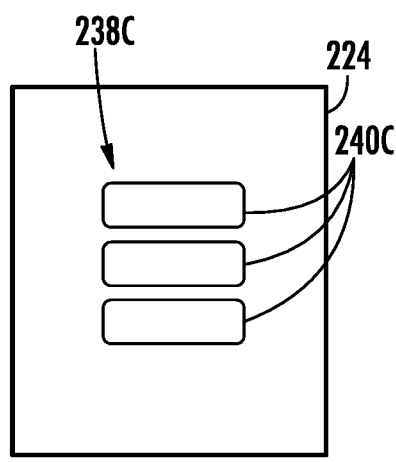

FIGS. 15-17 illustrate various example bores 240 and layouts of bores 240 for nozzle 238. FIG. 15 is a bottom view of an example fluid ejector 224 having a nozzle 238A. Nozzle 238A comprises a cluster of circular bores 240A, arranged about a center point 241. Each of bores 240A is dimensioned as described above with respect to the individual bores 240. In the example illustrated, bores 240A are sufficiently dense and closely spaced such that individual fluid droplets being ejected during a single actuation merge after ejection or upon material 30. In the example illustrated, bores 240A are spaced from one another by a spacing of less than or equal to 10 um.

FIG. 16 is a bottom view of an example fluid ejector 224 having a nozzle 238B. Nozzle 238B comprises a two dimensional array or cluster of non-circular bores 240B. Each of bores 240B is dimensioned as described above with respect to the individual bores 240. In the example illustrated, bores 240B are sufficiently dense and closely spaced such that individual fluid droplets being ejected during a single actuation merge after ejection or upon material 30. In the example illustrated, bores 240B are spaced from one another by a spacing of less than or equal to 10 um. Although bores 240B are illustrated as having an oval or ellipse shape, in other implementations, bores 240 may have other non-circular shapes, such as any of the non-circular shapes illustrated and described above respect to FIGS. 3-10. Such non-circular shapes may further inhibit the intrusion of airborne particulate build material particles into ejection chamber 226.

FIG. 17 is a bottom view of an example fluid ejector 224 having a nozzle 238C. Nozzle 238C comprises a row of non-circular bores 240C, shown as rectangles. Each of bores 240C is dimensioned as described above with respect to the individual bores 240. In the example illustrated, bores 240C are sufficiently dense and closely spaced such that individual fluid droplets being ejected during a single actuation merge after ejection or upon material 30. In the example illustrated, bores 240C are spaced from one another by a spacing of less than or equal to 10 um.

Figure 18:
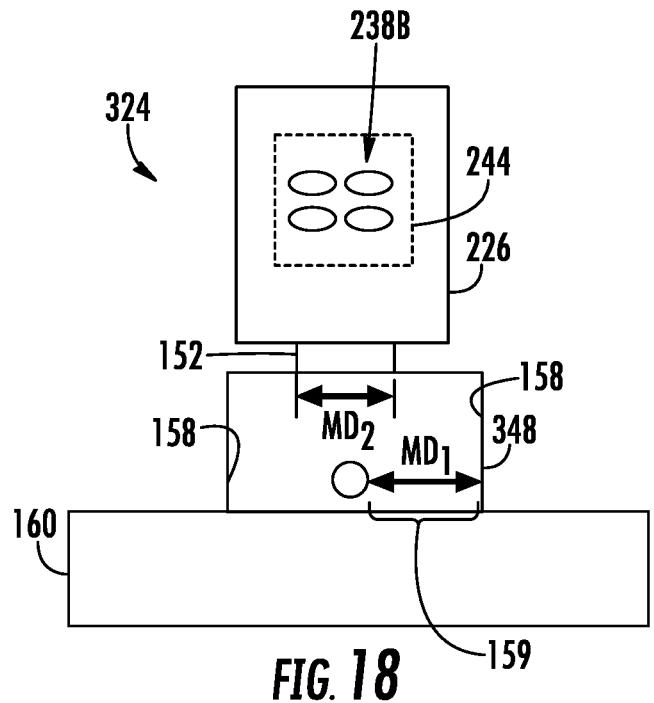
FIG. 18 is a sectional view of an example fluid ejector for the system of FIG. 13.

FIG. 18 is a diagram providing a sectional view schematically illustrating an example fluid ejector 324. Fluid ejector 324 comprises ejection chamber 326, nozzle 238B and fluid actuator 244 (shown in broken lines). Fluid ejector 324 further comprises inlet 348 and pillar 150. Ejection chamber 326 comprises an internal volume extending adjacent to bores 240B. Ejection chamber 326 fills or receives fluid to be ejected through bores 240B. Port 152 is described above respect a fluid ejector 124.

Inlet 348 is similar to inlet 148 described above except that inlet 348 omits tapered region 154. As with inlet 148, inlet 348 directs fluid from fluid supply 160 to port 152 for entry into ejection chamber 226. 150 is described above with respect to fluid ejector 124. As in fluid ejector 1124, pillar 150 in fluid ejector 324 comprises a column located within inlet 348. Pillar 150 is spaced from internal sides 158 of inlet 148 so as to form at least one passage 159 between one of sides 158 and pillar 150. Passage 159 has a minor dimension greater than the minor dimension of port 152 facilitating the passage of particulate build material particles into fluid supply 160. As a result, particulate build material particles that may have entered through bore 140 and passed through port 152 into inlet 148 do not become and trapped within inlet 148 by pillar 150, potentially occluding or impeding the supply of fluid to ejection chamber 126 of fluid ejector 324.

Figure 19:
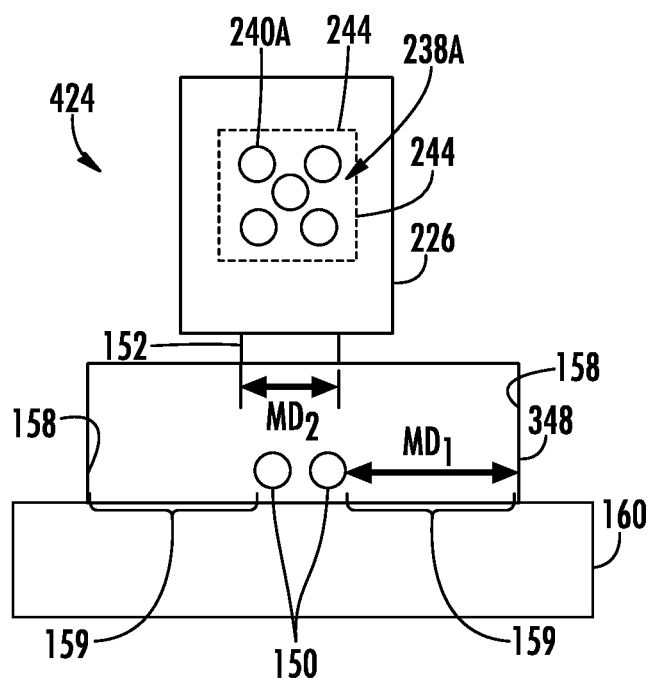
FIG. 19 is a sectional view of an example fluid ejector for the system of FIG. 13.

FIG. 19 is a diagram providing a sectional view schematically illustrating an example fluid ejector 424. Fluid ejector 424 similar to fluid ejector 324 except that fluid ejector 424 comprises a nozzle 238A (described above) in place of nozzle 238B and comprises a pair of pillars 150 within inlet 348. Those remaining components of fluid ejector 424 which correspond to components of fluid ejector 324 are numbered similarly.

Pillars 150 comprise columns extending within inlet 348. Pillars 150 inhibit the entry of contaminants or particles from fluid supply 160 into inlet 348. At the same time, pillars 150 are spaced from sides 158 of inlet 348 so as to form fluid passages 159 on either side of the pair of pillars 150. As with fluid passage 159 in fluid ejector 324, fluid passages 159 in fluid ejector 424 have minor dimensions MD1, the smallest dimension, which is greater than the minor dimension MD2, the smallest dimension, of port 152. As a result, particulate build material particles that may have entered through bores 240A and passed through port 152 into inlet 348 do not become and trapped within inlet 348 by pillars 150, reducing the likelihood of such particles potentially occluding or impeding the supply of fluid to ejection chamber 126 of fluid ejector 124.

Figure 20:
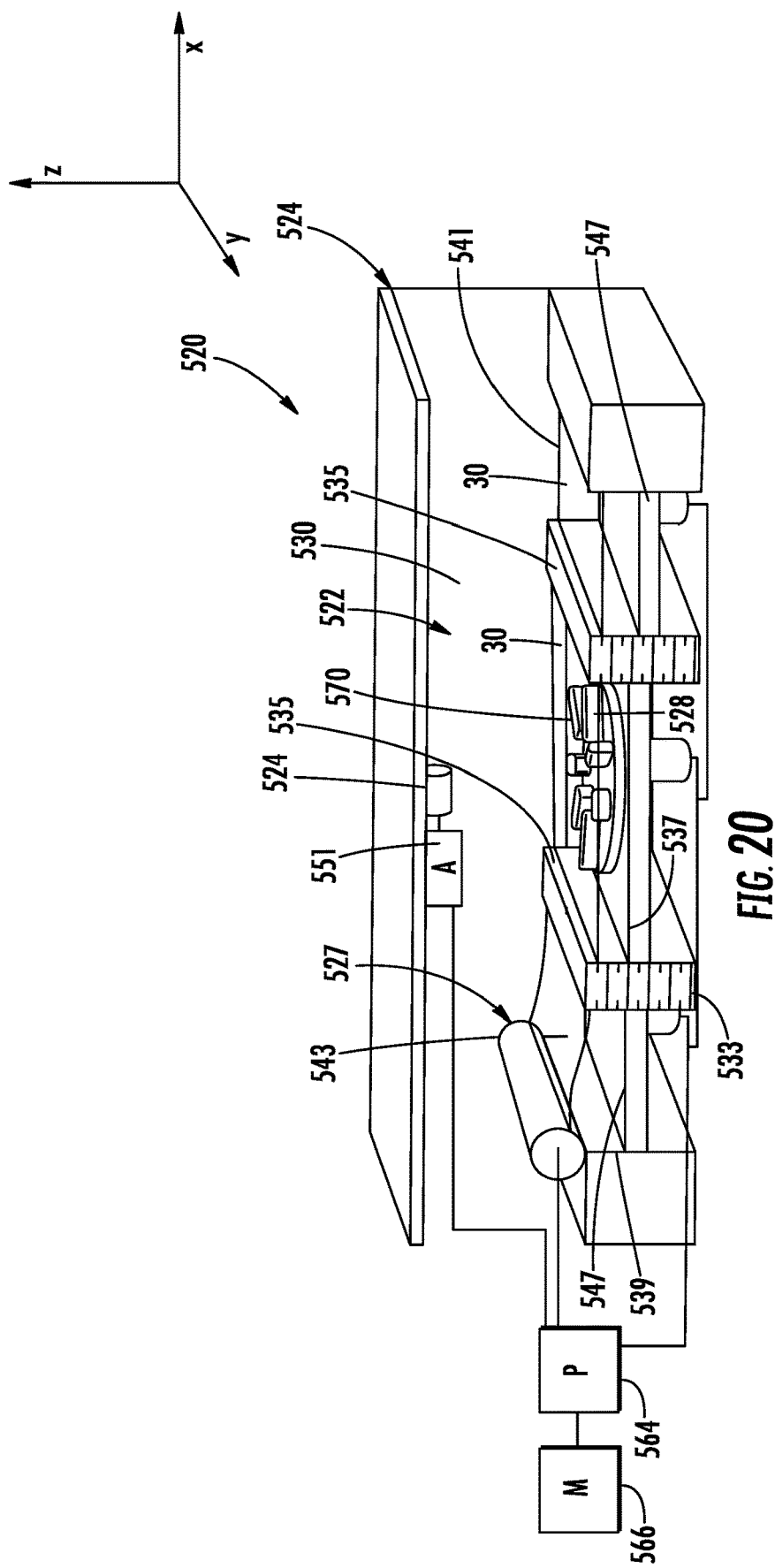
FIG. 20 is a perspective view of an example additive manufacturing system.
Figure 21:
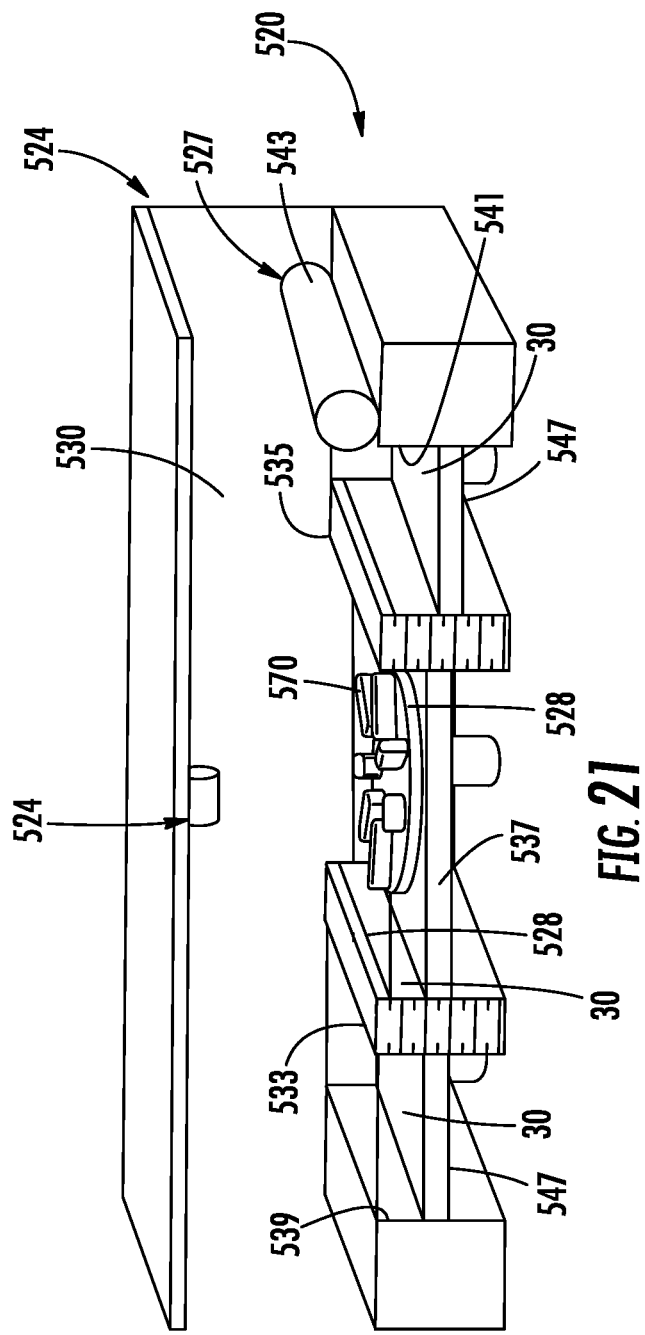
FIGS. 21 and 22 are perspective views of the example additive manufacturing system of FIG. 20 illustrating the fabrication of a three-dimensional object.
Figure 22:
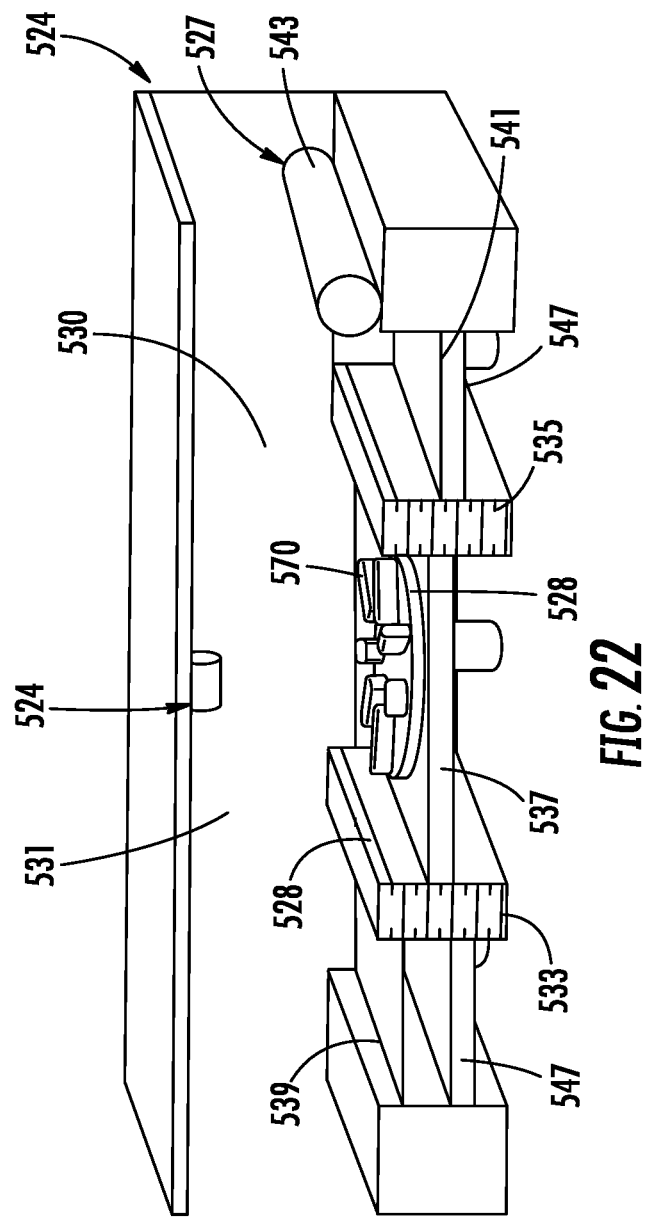

FIGS. 20-22 are diagrams illustrating an example additive manufacturing system 520 and its operation. Additive manufacturing system 520 comprises build bed 522, building material supply and distribution system 527 and building material fluid ejector 524. Build bed 522 comprises a volume to contain a build material, such as a powder matrix, as portions of the powder matrix are solidified, layer by layer, to form a three-dimensional object within the powder matrix. Build bed 522 comprises sidewalls 533, 535 and floor 537. In the example illustrated, floor 537 comprises a movable platform to be raised and lowered by an actuator under the control of processor 564. In other implementations, floor 537 is stationary while sidewalls 533, 535 are vertically movable by an actuator under control of processor 564. In the example illustrated, floor 537 is sequentially lowered by a predefined distance, substantially equal to a predefined thickness of build material which is to form the next layer of the three-dimensional object being generated.

Building material supply and distribution system 527 supplies build material to build bed 522. System 527 supplies printing material over and above a previously formed and solidified layer of the three-dimensional object being formed. In the example illustrated, system 527 comprises build material supply bins 539, 541 and roller 543. Each supply bin 539, 541 contains a supply of the build material, such as a powder matrix. Each supply bin 539, 541 comprises an underlying piston or platform 547 which is selectively raised and lowered to raise an amount of build material above one of sidewalls 533, 535 such that roller 543 may push the contained printing material over sidewalls 533, 535 into and across build bed 522, above the previously formed solidified layers of the object or objects being generated within bed 522.

Fluid ejector 524 comprises a device to selectively solidify portions of the build material within bed 522, layer upon stacked layer, to form three-dimensional object or objects being generated. In the example illustrated, fluid ejector 524 may comprise fluid ejector 24, fluid ejector 224, fluid ejector 324 or fluid ejector 424 described above. Fluid ejector 524 ejects fluid that facilitates the solidification of the particulate build material 30. In some implementations, fluid ejector 524 selectively ejects or emits a solidifying fluid substance, such as adhesive, epoxy, chemical catalyst or the like which causes selected portions of the build material within bed 522 to be solidified. For example, in one implementation, fluid ejector 524 selectively prints or ejects an adhesive onto the build material contained within bed 522 to form a layer of the three-dimensional object or objects being generated. In yet another implementation, an energy absorbing agent is printed on the particulate build material, such as a powder, wherein energy is applied to the build material and energy absorbing agent to selectively solidify, layer by layer, portions of the build material into a solid structure based upon the distribution of the energy absorbing agent.

In one example implementation, the particulate build material comprises a particulate build material selected from a group of build materials consisting of polyamides, ceramics, or metals. In such an example implementation, the fluid ejected by fluid ejector 24 comprises a fluid selected from a group of fluids consisting of fusing agents, cooling agents, adhesives, catalysts or reactants. In such an example implementation, the non-circular bore 40 has a cross-sectional area of at least 100 um$^2$ and a minimum dimension less than or equal to 10 um. In one implementation, the particulate build material comprises a polyamide having individual particulates having a range of sizes between 1 um and 150 um, wherein the fluid utilized to solidify the particulate material comprises fusing agents and cooling agents and wherein the non-circular bore has a cross-sectional area of at least 280 um and a minimum dimension less than or equal to 10 um.

FIGS. 20-22 illustrate generation of three-dimensional objects by system 520. Once processor 564 has received a digital representation of the object or objects to be manufactured, processor 564 digitally slices the received objects for generation. As shown by FIGS. 20 and 21, platform 547 of the left bin 539 is raised to push build material above the left side wall 533. Processor 564, following instructions contained in a non-transitory computer readable medium 566, outputs signals causing actuator to move spreader 543, shown as a roller, to the right so as to push and distribute particulate build material over the left wall 533 across build bed 522 and above the previously solidified layer. Any excess material is deposited in bin 541, for which platform 547 is lowered.

As shown by FIG. 21, processor 564 outputs control signals causing fluid ejector 524 to selectively solidify selected portions of the build material within build bed 522 by depositing fluid on selected portions of the particulate build material. In the example illustrated, processor 564 outputs control signals controlling the positioning of fluid ejector 524 with an actuator 551 (schematically shown). Actuator 551 comprises a device that moves fluid ejector 524 so as to scan fluid ejector 524 and both the x and y dimensions across particulate build material 30 within build bed 522. In one implementation, actuator 551 may comprise electric motors with chains or belts that two dimensionally translate ejector 524 above bed 522. As ejector 54 is appropriately positioned over the particulate build material in bed 522, processor 524 outputs control signals causing the fluid actuator to eject the fluid onto the underline particular build material. In one implementation, actuator 551 moves fluid ejector 124 across the build bed at a maximum speed of less than or equal to 40 in./s.

As shown by FIG. 22, once solidification of the new layer has been completed, processor 564 outputs control signals causing the platform of virtual build bed 522 to lower, the platform 547 of bin 539 to lower and the platform 547 of bin 541 to rise so to push build material to a height above the top of the right most side wall 535. Thereafter, processor 564 outputs signals causing spreader 543 to return, moving back to the right, so as to push build material over the right side wall 535 and on top of the previous solidified layer within build bed 522. Excess build material is deposited within bin 539. The processes illustrated in FIGS. 20-22 are repeated, layer by layer, until each of the objects has been completed. Thereafter, the completed object 570 may be removed from any remaining unused or un-solidified build material 30 within build bed 522.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An additive manufacturing system comprising:
    a build material distributor to distribute build material in a build area of the system;
    a fluid ejector movable across the build area at a maximum speed of less than or equal to 40 inches per second, the fluid ejector comprising a nozzle having a non-circular bore.

2. The additive manufacturing system of claim 1, wherein the non-circular bore has an hourglass shape.

3. The additive manufacturing system of claim 1, wherein the non-circular bore has a shape selected from a group of shapes consisting of: an ellipse, a rectangle, a cross, a polygon and a triangle.

4. The additive manufacturing system of claim 1 further comprising a fluid actuator, wherein the nozzle comprises a second bore and wherein the fluid actuator is to concurrently drive fluid through both the non-circular bore and the second bore.

5. The additive manufacturing system of claim 1, wherein the fluid ejector comprises:
    an ejection chamber adjacent the non-circular bore, the ejection chamber having a port having a first minor dimension;
    an inlet wider than the port; and
    a pillar within the inlet to form a passage between the pillar and a side of the inlet, the passage having a second minor dimension greater than the first minor dimension.

6. The additive manufacturing system of claim 1, wherein the fluid ejector comprises:
    an ejection chamber opposite the non-circular bore, the injection chamber having a port having a first cross-sectional area;
    an inlet wider than the port; and
    a pillar within the inlet to form a passage between the pillar and a side of the inlet, the passage having a second cross-sectional area greater than the first cross-sectional area.

7. A fluid ejector for an additive manufacturing system, the fluid ejector comprising:
    an ejection chamber;
    a fluid actuator adjacent the ejection chamber; and
    a nozzle along the ejection chamber, the nozzle comprising a plurality of bores through which fluid is to be concurrently driven by the fluid actuator.

8. The fluid ejector of claim 7, wherein the plurality of bores have a non-circular shape.

9. The fluid ejector of claim 8, wherein the plurality of bores are arranged in a two dimensional array of bores.

10. A fluid ejector for an additive manufacturing system, the fluid ejector comprising:
    an ejection chamber having a port having a first major dimension;
    a nozzle extending from the ejection chamber;
    a fluid actuator adjacent the ejection chamber;
    an inlet leading to the port and wider than the port; and
    a pillar within the inlet to form a passage between the pillar and a side of the inlet, the passage having a second major dimension greater than the first major dimension.

11. The fluid ejector for an additive manufacturing system of claim 10, wherein nozzle comprises a non-circular bore.

12. The fluid ejector for an additive manufacturing system of claim 11, wherein the non-circular bore has an hourglass shape.

13. The fluid ejector for an additive manufacturing system of claim 11, wherein the non-circular bore has a shape selected from a group of shapes consisting of: an ellipse, a rectangle, a cross, a polygon and a triangle.

14. The fluid ejector of claim 10, wherein the nozzle comprises a plurality of bores and wherein the fluid actuator is to concurrently drive fluid through the plurality of bores.

15. The fluid ejector for an additive manufacturing system of claim 14, wherein each of the plurality of bores has a non-circular shape.

16. The fluid ejector for an additive manufacturing system of claim 10, wherein the pillar is the sole pillar within the inlet.

17. An additive manufacturing system comprising:
    a build material distributor to distribute build material in a build area of the system;
    a fluid ejector movable across the build area to selectively eject a fluid agent into build material in the build area to form a cross-section of an object being built from the build material, the fluid ejector comprising a nozzle having a non-circular bore or multiple bores.

18. The additive manufacturing system of claim 17, wherein the nozzle has an hourglass shaped bore with a throat region between two larger regions.

19. The additive manufacturing system of claim 17, wherein the nozzle comprises multiple bores.

20. The additive manufacturing system of claim 17, wherein the bore or bores are dimensioned such that a particle of the build material is too large to enter any bore in at least one dimension.

* * * * *